US006205322B1

(12) United States Patent
Muramatsu

(10) Patent No.: US 6,205,322 B1
(45) Date of Patent: Mar. 20, 2001

(54) SELECTIVE CALL RECEIVER

(75) Inventor: Toshihiko Muramatsu, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/030,850

(22) Filed: Feb. 26, 1998

(30) Foreign Application Priority Data

Feb. 28, 1997 (JP) .................................................... 9-045779

(51) Int. Cl.[7] ........................................................ H04B 7/00

(52) U.S. Cl. ......................... 455/31.2; 455/426; 455/566; 340/825.44

(58) Field of Search ................................ 455/31.1, 31.2, 455/31.3, 426, 414, 412, 415, 566, 38.1, 38.4; 340/825.44, 825.69, 815.4, 815.53

(56) References Cited

U.S. PATENT DOCUMENTS

| | | | | |
|---|---|---|---|---|
| 4,870,402 | | 9/1989 | DeLuca et al. . | |
| 5,784,001 | * | 7/1998 | Deluca et al. .................. | 340/825.44 |
| 6,020,828 | * | 2/2000 | Gotou .............................. | 340/825.44 |

FOREIGN PATENT DOCUMENTS

| | | | |
|---|---|---|---|
| 0589417A2 | * | 3/1994 | (EP) . |
| 2280769 | * | 2/1995 | (GB) . |
| 2 283 597 | | 10/1995 | (GB) . |
| 1-277887 | | 11/1989 | (JP) . |
| 2-93592 | | 4/1990 | (JP) . |
| 7-226969 | | 8/1995 | (JP) . |
| 8-130760 | | 5/1996 | (JP) . |
| 8-340562 | | 12/1996 | (JP) . |
| WO 91/15835 | | 10/1991 | (WO) . |

* cited by examiner

*Primary Examiner*—Nay Maung
(74) *Attorney, Agent, or Firm*—McGuireWoods LLP

(57) ABSTRACT

A selective call receiver includes a memory which stores a plurality of conversion tables each having a different character set. Each conversion table is used to convert a numeral code to a display character code for displaying visual information on screen. A table selector selects a conversion table from the plurality of conversion tables according to a table selection code which is included in the message data. A converter converts each numeral code included in message data following the table selection code into a display character code by using a selected conversion table.

20 Claims, 12 Drawing Sheets

CONVERSION TABLE T1

| ROW \ COL. | 1 | 2 | 3 | 4 | 5 | 6 | 7 | 8 | 9 | 0 |
|---|---|---|---|---|---|---|---|---|---|---|
| 1 | ｱ | ｲ | ｳ | ｴ | ｵ | A | B | C | D | E |
| 2 | ｶ | ｷ | ｸ | ｹ | ｺ | F | G | H | I | J |
| 3 | ｻ | ｼ | ｽ | ｾ | ｿ | K | L | M | N | O |
| 4 | ﾀ | ﾁ | ﾂ | ﾃ | ﾄ | P | Q | R | S | T |
| 5 | ﾅ | ﾆ | ﾇ | ﾈ | ﾉ | U | V | W | X | Y |
| 6 | ﾊ | ﾋ | ﾌ | ﾍ | ﾎ | Z | ? | ! | - | / |
| 7 | ﾏ | ﾐ | ﾑ | ﾒ | ﾓ | ¥ | & |  |  |  |
| 8 | ﾔ | ( | ﾕ | ) | ﾖ | * | # | SP | SP | (SPEC.) |
| 9 | ﾗ | ﾘ | ﾙ | ﾚ | ﾛ | 1 | 2 | 3 | 4 | 5 |
| 0 | ﾜ | ｦ | ﾝ | ﾞ | ﾟ | 6 | 7 | 8 | 9 | 0 |

FIG.3B

CONVERSION TABLE T2

| ROW \ COL. | 1 | 2 | 3 | 4 | 5 | 6 | 7 | 8 | 9 | 0 |
|---|---|---|---|---|---|---|---|---|---|---|
| 1 | あ | い | う | え | お | a | b | c | d | e |
| 2 | か | き | く | け | こ | f | g | h | i | j |
| 3 | さ | し | す | せ | そ | k | l | m | n | o |
| 4 | た | ち | つ | て | と | p | q | r | s | t |
| 5 | な | に | ぬ | ね | の | u | v | w | x | y |
| 6 | は | ひ | ふ | へ | ほ | z | ♠ | ♥ | ♦ | ♣ |
| 7 | ま | み | む | め | も | ● | ○ | $ | (Y) | (M) |
| 8 | や | ( | ゆ | ) | よ | D | : | (MIN) | (SEC) | (SPEC.) |
| 9 | ら | り | る | れ | ろ | ぁ | ぃ | ぅ | ぇ | ぉ |
| 0 | わ | を | ん | ゛ | ゜ | ゃ | ゅ | ょ | っ | |

EEPROM

| SPECIFIC CODE | FUNCTION |
|---|---|
| — — | CONVERSION BEGINNING |
| 80 | TABLE CHANGE |

CONVERSION TABLE T3

| ROW \ COL. | 1 | 2 | 3 | 4 | 5 | 6 | 7 | 8 | 9 | 0 |
|---|---|---|---|---|---|---|---|---|---|---|
| 1 | ア | イ | ウ | エ | オ | A | B | C | D | E |
| 2 | カ | キ | ク | ケ | コ | F | G | H | I | J |
| 3 | サ | シ | ス | セ | ソ | K | L | M | N | O |
| 4 | タ | チ | ツ | テ | ト | P | Q | R | S | T |
| 5 | ナ | ニ | ヌ | ネ | ノ | U | V | W | X | Y |
| 6 | ハ | ヒ | フ | ヘ | ホ | Z | ? | ! | – | / |
| 7 | マ | ミ | ム | メ | モ | ¥ | & |  |  |  |
| 8 | ヤ | ( | ユ | ) | ヨ | * | # | SP | SP | (SPEC.) |
| 9 | ラ | リ | ル | レ | ロ | 1 | 2 | 3 | 4 | 5 |
| 0 | ワ | ヲ | ン | " | ° | 6 | 7 | 8 | 9 | 0 |

FIG.8B

CONVERSION TABLE T4

| COL. / ROW | 1 | 2 | 3 | 4 | 5 | 6 | 7 | 8 | 9 | 0 |
|---|---|---|---|---|---|---|---|---|---|---|
| 1 | あ | い | う | え | お | a | b | c | d | e |
| 2 | か | き | く | け | こ | f | g | h | i | j |
| 3 | さ | し | す | せ | そ | k | l | m | n | o |
| 4 | た | ち | つ | て | と | p | q | r | s | t |
| 5 | な | に | ぬ | ね | の | u | v | w | x | y |
| 6 | は | ひ | ふ | へ | ほ | z | ♠ | ♥ | ♦ | ♣ |
| 7 | ま | み | む | め | も | ● | ○ | $ | (Y) | (M) |
| 8 | や | ( | ゆ | ) | よ | (D) | : | (MIN) | (SEC) | (SPEC.) |
| 9 | ら | り | る | れ | ろ | ぁ | ぃ | ぅ | ぇ | ぉ |
| 0 | わ | を | ん | ゛ | ゜ | ゃ | ゅ | ょ | っ | |

FIG.9

EEPROM

| SPECIFIC CODE | | FUNCTION |
|---|---|---|
| -- | | CONVERSION BEGINNING |
| 80 | | TABLE CHANGE |
| | 01 | CHANGE TO TABLE T1 |
| | 02 | CHANGE TO TABLE T2 |
| | 03 | CHANGE TO TABLE T3 |
| | 04 | CHANGE TO TABLE T4 |

SELECTIVE CALL RECEIVER

BACKGROUND OF THE INVENTION

1. Field of the Invention

The present invention generally relates to a selective call receiver, and in particular to a selective call receiver having a message displaying function.

2. Description of Related Art

Selective call receivers have been widely used for various purposes and, especially, a small-sized and lightweight selective call receiver called a pager is suitable for being taken on the road. One of basic functions of the selective call receiver is to inform by beep sound, vibration, or light a user of the incoming call. Further, some selective call receiver has not only such an alert function but also a function of displaying a numeric message on an liquid-crystal display (LCD). However, since only numerals are used to display information on LCD, the transmitted information cannot be interpreted with precision.

To improve power of expression, a selective call receiver having a conversion table from a numerical code to a display character code has been proposed in Japanese Patent Unexamined Publication No. 7-226969. More specifically, when detecting a two-digit message code from received message data, a display character code corresponding to the message code is retrieved from the conversion table. In this manner, all message codes are converted to the corresponding display characters which are used to display the received information on LCD.

However, the prior art cannot provide a sufficiently wide variety of display characters but only the limited power of display expression. In the conventional receiver, since each of the two digits of the message code is selected from 10 numeral characters: 0–9, the maximum number of display characters stored in the conversion table is limited to 100. Therefore, it is very difficult to extend the variety of display characters without reducing transmission performance.

SUMMARY OF THE INVENTION

An object of the present invention is to provide a selective call receiver which can increase the number of kinds of display characters.

According to the present invention, a selective call receiver is provided with a memory which stores a plurality of conversion tables each having a different character set, wherein each conversion table is used to convert a numeral code to a display character code for displaying visual information on screen. A table selector selects a conversion table from the plurality of conversion tables according to a table selection code which is included in the message data. A converter converts each numeral code included in message data following the table selection code into a display character code by using a selected conversion table.

Since the plurality of conversion tables having different character sets are selectively used according to a table selection code included in a received message, the number of kinds of characters and symbols to be displayed is increased, resulting in enhanced power of expression.

The table selection code may be a first predetermined code indicating a beginning of conversion. The table selection code may further include a second predetermined code at a position behind the first predetermined code, wherein the second predetermined code indicates table change from one to another in a predetermined order. Alternatively, the table selection code may further include a second predetermined code at a position behind the first predetermined code, wherein the second predetermined code comprises a table change code followed by a selection code which is used to select a conversion table.

BRIEF DESCRIPTION OF THE DRAWINGS

FIG. 3B is a schematic diagram showing an example of conversion code table T2;

FIG. 8B is a schematic diagram showing an example of conversion code table T4;

FIG. 9 is a schematic diagram showing another example of a set of specific codes stored in EEPROM;

DETAILED DESCRIPTION OF THE PREFERRED EMBODIMENTS

Figure 1:
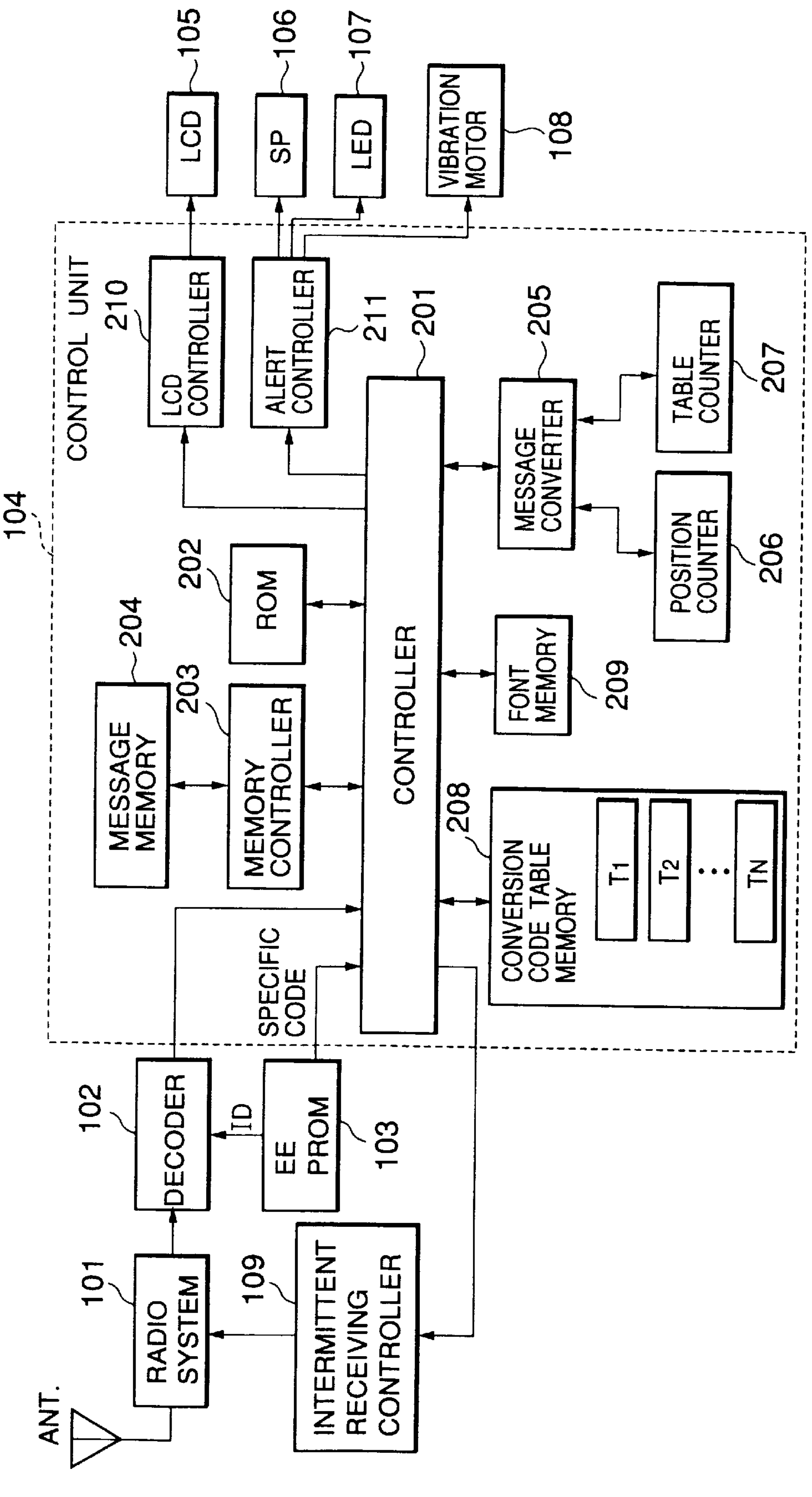
FIG. 1 is a block diagram showing the functional arrangement of an embodiment of a selective call receiver according to the present invention.

Referring to FIG. 1, a radio system module 101 receives a radio signal from a radio base station (not shown) of a selective calling system through a built-in antenna. The received radio signal is demodulated into a baseband signal which is transferred as a selective calling signal from the radio system module 101 to a decoder 102.

The decoder 102 decodes the selective calling signal and searches the decoded selective calling signal for the identification (ID) number stored in an EEPROM (electrically-erasable programmable read-only memory) 103. When a selective calling number included in the decoded selective calling signal is identical to the ID number, the decoder 102 outputs a receiving interruption to a control unit 104 and then received message data following the selective calling number is transferred from the decoder 102 to the control unit 104.

The control unit 104 controls and LCD 105, speaker 106, LED 107, a vibration motor 108 and an intermittent receiving controller 109. More specifically, the control unit 104 is comprised of a controller 201 which executes an operating program and other function programs stored in a program ROM 202 to perform the operation control of the selective call receiver.

When the receiving interruption occurs, the controller 201 controls a memory controller 203 so that the received message data is stored onto a message memory 204. The controller 201 further checks whether the received message data includes a specific conversion code which is previously stored in the EEPROM 103. If the specific conversion code is found, the controller 201 controls a message converter 205 which is provided with a message position counter 206 and a table counter 207. The message converter 205 sequentially converts the message data following the specific conversion code into display characters while referring to a conversion code table memory 208. The conversion code table memory 208 stores a plurality of conversion tables $T_1$–$T_M$ from which a conversion table to be used is selected and used for message conversion. The table selection is determined by the count Q of the table counter 207. Hereinafter, it is assumed that a conversion table $T_Q$ (Q=1, 2, . . . , N) is selected by the count Q of the table counter 207.

The display data corresponding to a display character obtained by the message converter 205 is read from a font memory 209 and is transferred to an LCD controller 210 by which visible characters are displayed on the LCD 105. After that, the controller 201 controls an alert controller 211 so that an audible alert is generated by driving the speaker 106, a visible alert is generated by blinking the LED 107, or a vibration alert is generated by driving the vibration motor 108.

It should be noted that the control unit 104 may be implemented with a program-controlled processor such as CPU or DSP.

Figure 2A:
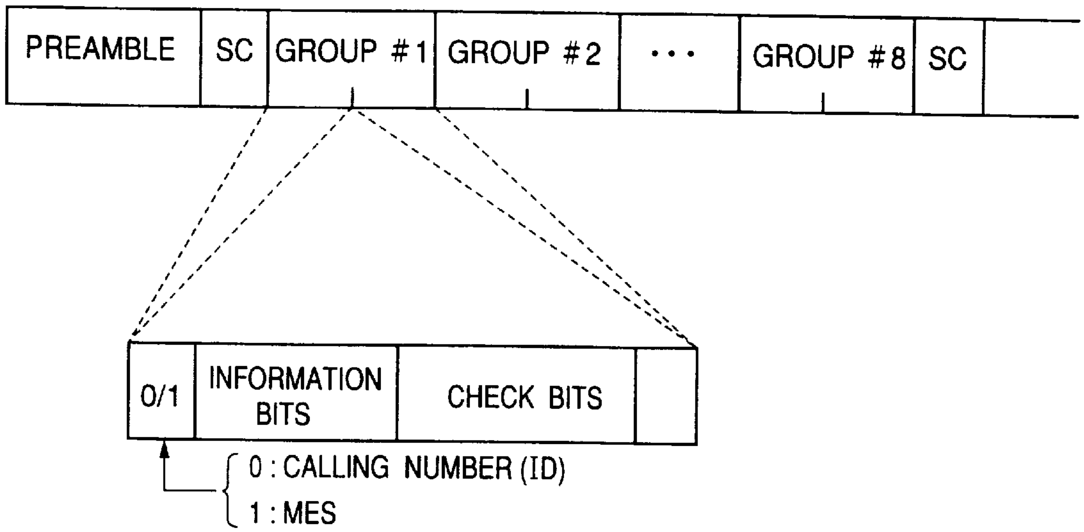
FIG. 2A is a schematic diagram showing the format of a signal which is received by the embodiment.

Referring to FIG. 2A, a selective calling signal is comprised of a preamble followed by a batch which consists of a synchronization code SC followed by eight groups G#1–G#8 each including a first code word and a second code word. Each code word consists of an information discrimination bit, information bits and check bits. When the information discrimination bit is 0, the information bits indicate a selective calling number (ID) or otherwise they indicate a message.

Figure 2B:
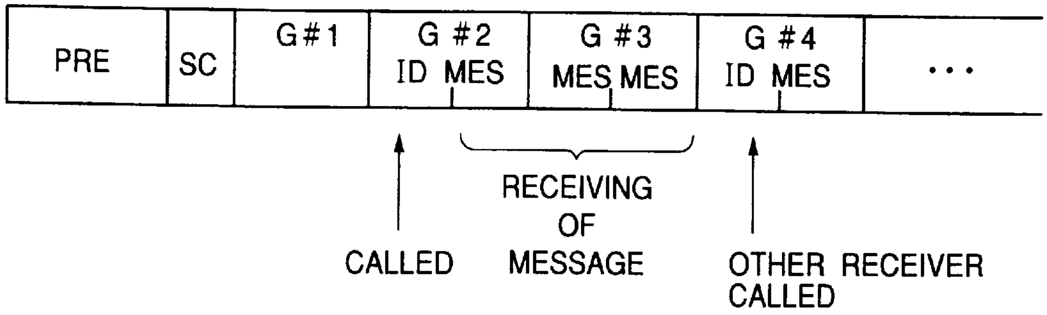
FIG. 2B is a schematic diagram showing the explanation of a receiving operation of the embodiment.

Referring to FIG. 2B, when a selective calling number of the group G#2 is identical to the ID number of its own, the decoder 102 outputs a receiving interruption to the controller 201. Subsequently, the decoder 102 transfers the message data following the selective calling number of the group G#2 as a received message to the controller 201 until a different ID number is detected. In this figure, the controller 201 recognizes the data ranging from the second code word of group G#2 to the second code word of group G#3 as a received message.

The conversion code table memory 208 stores a plurality of conversion tables T1–$T_M$ each having a different set of characters. For example, the followings may be considered; an uppercase alphanumeric character set, a lowercase alphanumeric character set, special character set, and any combination thereof may be employed. Further, alphabet sets of different languages may be used: English, German, French, Chinese, Korean, Japanese and other languages.

FIRST EMBODIMENT

Figure 3A:
FIG. 3A is a schematic diagram showing an example of conversion code table T1.
Figure 3A:
Figure 3A:

Referring to FIGS. 3A and 3B, there are each shown an example of conversion table in the case of two conversion tables $T_1$ and $T_2$ being stored in the conversion code table memory 208. As illustrated in FIG. 3A, the conversion table $T_1$ stores an uppercase alphabet character set, a numeric character set and several symbols. As illustrated in FIG. 3B, the conversion table $T_2$ stores a lowercase alphabet character set, time-of-day symbols and several marks.

Figures 4, 5:
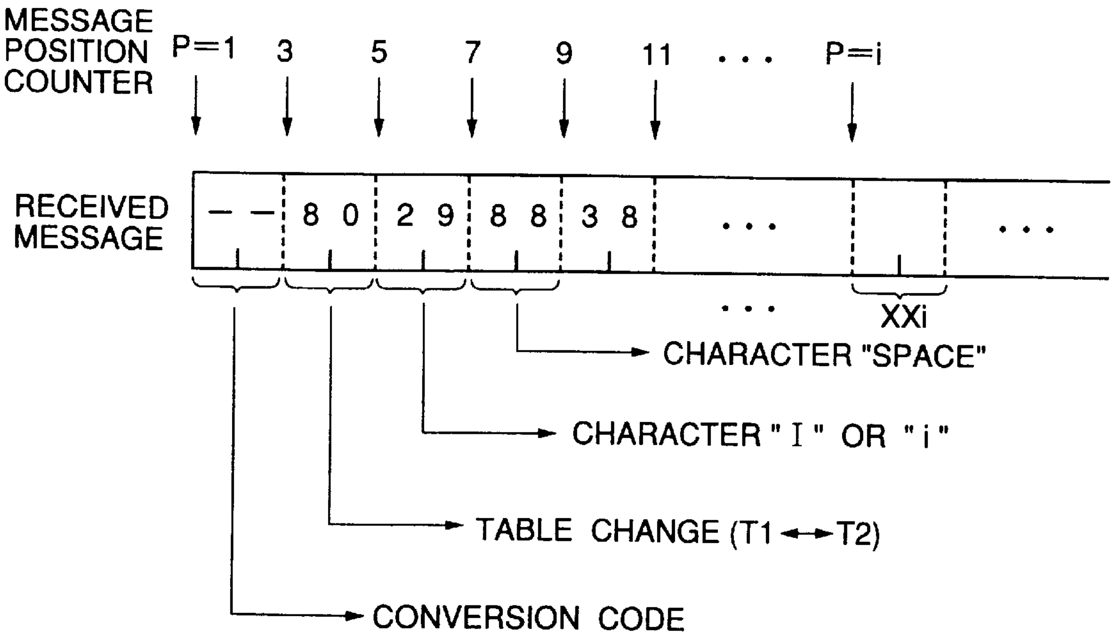
FIG. 4 is a schematic diagram showing an example of a set of specific codes stored in EEPROM.
FIG. 5 is a diagram showing an example of a received message code for explanation of specific codes and character codes.

As shown in FIG. 4, the EEPROM 103 further stores two kinds of specific code: "--" and "80". As will be described later, the first specific code "--" means that data following it is used for message conversion (hereinafter called a conversion code). The second specific code "80" means that a conversion table is changed to another (hereinafter, called a table change code). The details will be described referring to FIG. 5.

As illustrated in FIG. 5, it is assumed that a received message begins with the conversion code "--" followed by the table change code "80". In this case, since the table change code "80" appears after the conversion code "--", the message converter 205 changes a conversion table from $T_1$ to $T_2$ and vice versa. Therefore, in the case where the conversion Table $T_1$ as shown in FIG. 3A is selected, a code "29" is converted to an uppercase letter "I". On the other hand, in the case where the conversion table $T_2$ as shown in FIG. 3B is selected, the code "29" is converted to a lowercase letter "i".

Each code of the message consists of two digits each having 4 bits. The count P of the message position counter 206 indicates the position of a two-digit code or a single-digit numeric character to be read. Hereinafter, for simplicity, two-digit data indicated by the counter P of the message position counter 206 is represented by "$XX_P$".

Figure 6:
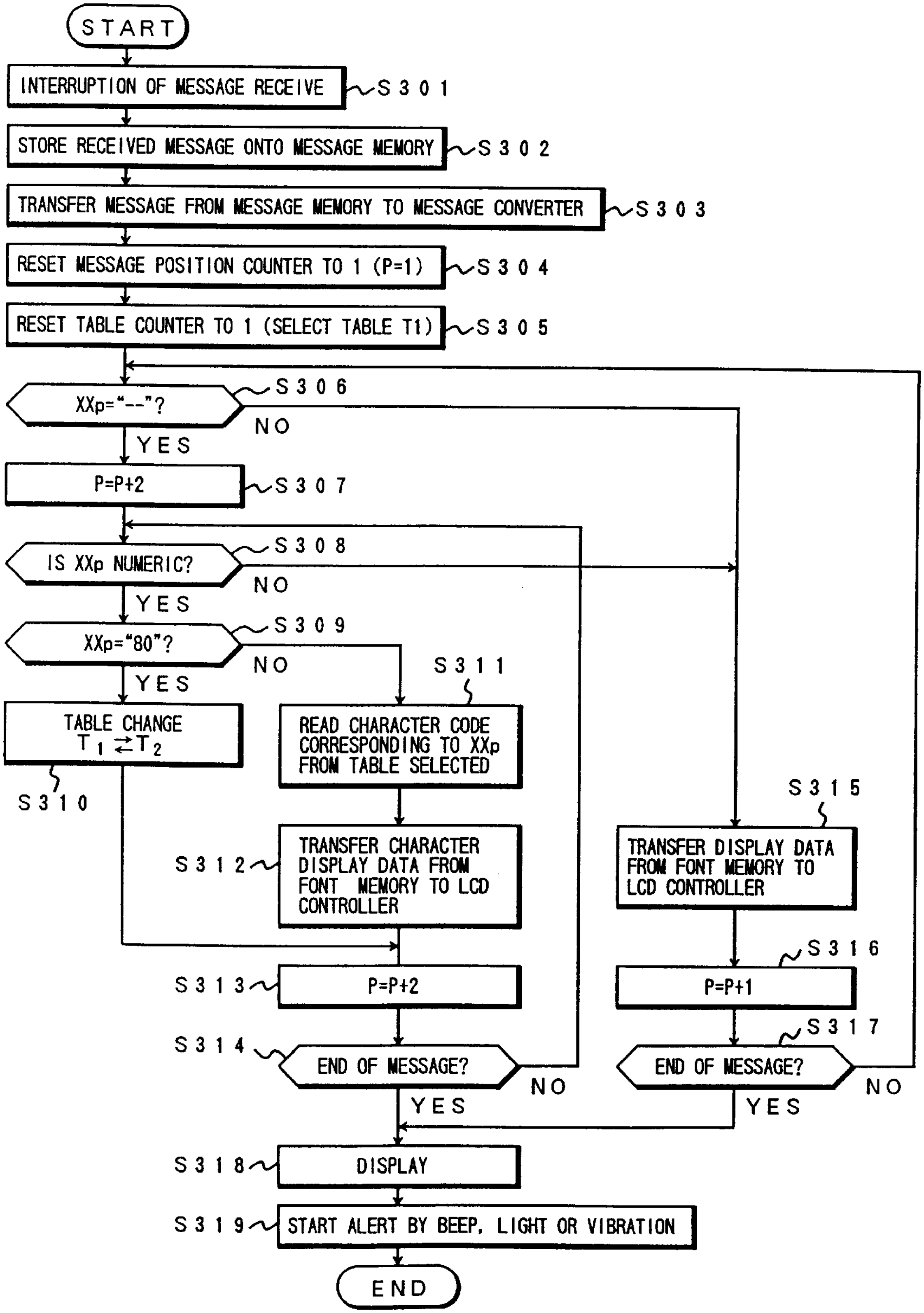
FIG. 6 is a flowchart showing a first embodiment of a message displaying operation according to the present invention.

Referring to FIG. 6, when receiving the receiving interruption from the decoder 102 (step S301), the controller 201 transfers the received message data from the decoder 102 to the message memory 204 through the memory controller 203 (step S302). Subsequently, the controller 201 transfers the message data to the message converter 205 (step S303). The message converter 205 initializes the message position counter 206 and table counter 207 such that the message position counter 206 is set to P=1 and the table counter 207 is set to Q=1, that is, the conversion table $T_I$ is initially selected (steps S304 and S305).

The message converter 205 checks whether the two-digit data $XX_P$ pointed by P=1 in the message data is identical to the conversion code "--" (step S306). If $XX_P$="--" (YES in step S306), the message converter 205 increments the position counter 206 by two (step S307) and further checks whether the subsequent two-digit data $XX_P$ is numeric (step S308). If the $XX_P$ is numeric (YES in step S308), the message converter 205 further checks whether the $XX_P$ is identical to the table change code "80" (step S309).

If the $XX_P$="80" (YES in step S309), the message converter 205 selects another conversion table by setting the table counter 207 to another value (step S310). More specifically, when the table counter 207 has been set to Q=1, if $XX_P$="80", then the table counter 207 is changed to Q=2. When the table counter 207 has been set to Q=2, if the $XX_P$="80", then the table counter 207 is changed to Q=1. In this manner, a conversion table $T_Q$ is selected according to The count Q of the table counter 207.

If the $XX_P$ is not identical to "80" (NO in step S309), the message converter 205 reads a character code corresponding to the $XX_P$ from the selected conversion table $T_Q$ (step S311). Subsequently, the controller 201 reads character display data corresponding to the character code from the font memory 209 and then transfers it to the LCD controller 210 (step S312).

After the step S310 or S312 is completed, the message converter 205 increments the position counter 206 by two (step S313) and then checks whether the position counter 206 indicates the end of the message (step S314). If the position count P does not indicate the end of the message (NO in step S314), the steps S308–S313 are repeatedly performed until the count P indicates the end of the message.

On the other hand, if the $XX_P$ is not identical to "--" (NO in step S306) or the $XX_P$ is not numeric (NO in step S308), the $XX_P$ is normal message data. Therefore, the controller 201 reads display data corresponding to the first digit of the $XX_P$ from the font memory 209 and then transfers it to the LCD controller 210 (step S315). After that, the message converter 205 increments the position counter 206 by one (step S316) and then checks whether the position counter 206 indicates the end of the message (step S317).

When the position count P indicates the end of the message (YES in steps S314 or S317), the controller 201 controls the LCD controller 210 so that the display data is displayed on LCD 105 (step S318). And the controller 201 controls the alert controller 211 so that an artist is generated by an alert device selected from the speaker 106, the LED 107 and the vibration motor 108 (step S319).

Figure 7A:
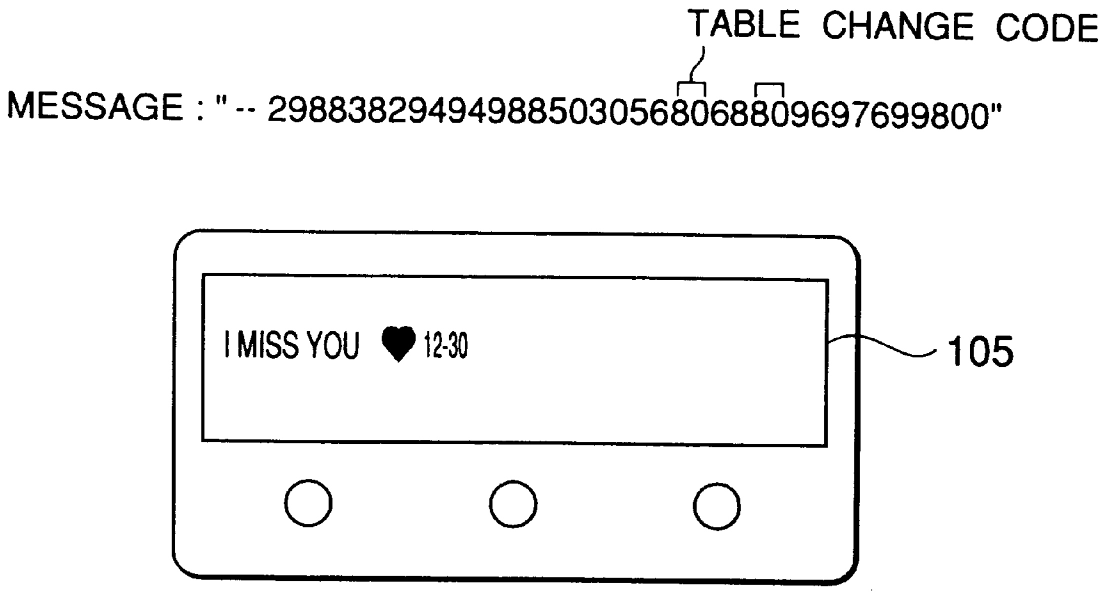
FIG. 7A is a diagram showing an example of a displayed message according to the first embodiment of a message displaying operation according to the present invention.

As illustrated in FIG. 7A, when receiving a message including a string of alphanumeric characters: "--2988382949498850305680688096976998 00", since the numeric code "29" follows the conversion code "--", the message converter 205 converts the code "29" to an uppercase letter "I" referring to the conversion table $T_1$ which is initially selected. Similarly, the subsequent codes "88" and "38" are converted to SPACE and an uppercase letter "M", respectively. Further, each the table change code "80" is detected, a conversion table is changed between $T_1$ and $T_2$. In this manner, the visual information as shown in FIG. 7A is displayed on the LCD 105.

Figure 7B:
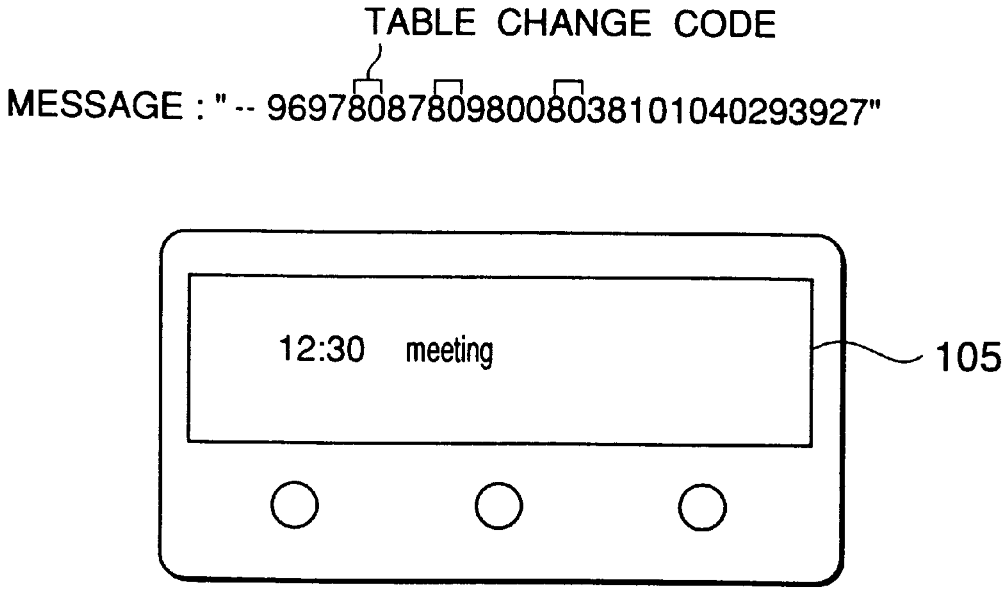
FIG. 7B is a diagram showing another example of a displayed message according to the first embodiment of a message displaying operation according to the present invention.

As illustrated in FIG. 7B, when receiving a message including a string of alphanumeric characters: "--96978087 8098008038101040293927", as in the case described above, the visual information as shown in FIG. 7B is displayed on the LCD 105.

As described above, the selection code and numerical codes are each formed with a combination of two numeric characters each selected from "0"–"9". Since a numeric character "0"–"9" can be formed with only four bits, a desired message can be transmitted without reducing in transmission performance.

SECOND EMBODIMENT

Figure 8A:
FIG. 8A is a schematic diagram showing an example of conversion code table T3.
Figure 8A:
Figure 8A:

Referring to FIGS. 8A and 8B, there are each shown extended conversion tables $T_3$ and $T_4$ in the case of four conversion tables $T_1$–$T_4$ being stored in the conversion code table memory 208. The conversion tables $T_1$ and $T_2$ are already shown in FIGS. 3A and 3B.

As illustrated in FIG. 8A, the conversion table $T_3$ stores a double-byte uppercase alphabet character set, a double-byte numeric character set and several double-byte symbols. As illustrated in FIG. 8B, the conversion table $T_4$ stores a double-byte lowercase alphabet character set, double-byte time-of-day symbols and several double-byte marks.

As shown in FIG. 9, the EEPROM 103 further stores six kinds of specific code: "--", "80", "01", "02", "03" and "04". As described before, the first specific code "--" is a conversion code and the second specific code "80" is a table change code). Further, the third specific code "01" means that, if it follows the table change code "80", the conversion table $T_1$ is selected. Similarly, the respective specific codes "02"–"04" following the table change code "80" cause the conversion tables $T_2$–$T_4$ to be selected.

Figure 10:
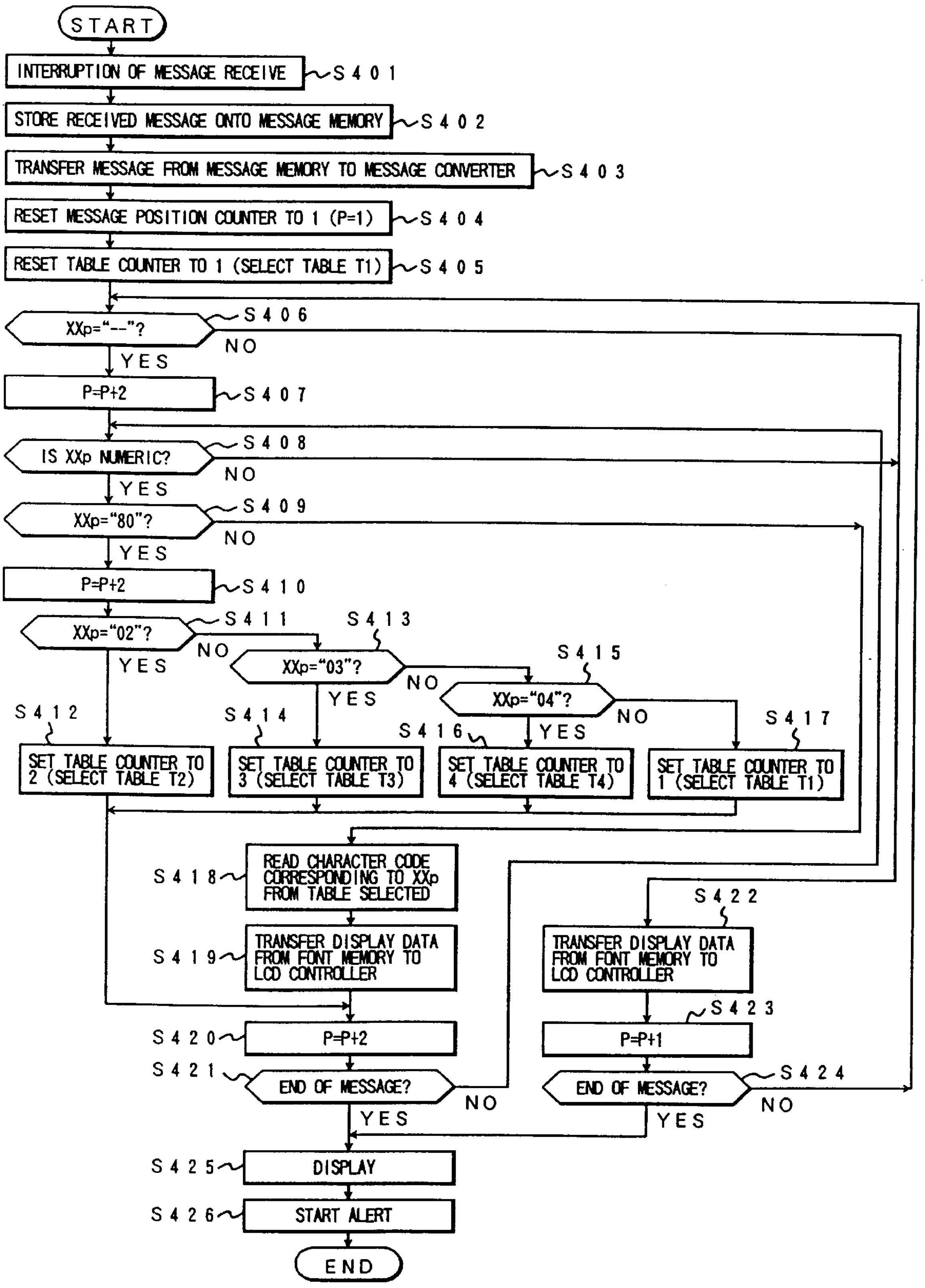
FIG. 10 is a flowchart showing a second embodiment of a message displaying operation according to the present invention.

Referring to FIG. 10, when receiving the receiving interruption from the decoder 102 (step S401), the controller 201 transfers the received message data from the decoder 102 to the message memory 204 through the memory controller 203 (step S402). Subsequently, the controller 201 transfers the message data to the message converter 205 (step S403). The message converter 205 initializes the message position counter 206 and table counter 207 such that the message position counter 206 is set to P=1 and the table counter 207 is set to Q=1, that is, the conversion table $T_1$ is initially selected (S404 and S405).

The message converter 205 checks whether the two-digit data $XX_P$ pointed by P=1 in the message data is identical to the conversion code "--" (step S406). If $XX_P$="--" (YES in step S406), the message converter 205 increments the position counter 206 by two (step S407) and further checks whether the subsequent two-digit data $XX_P$ is numeric (step S408). If the $XX_P$ is numeric (YES in step S408), the message converter 205 further checks whether the $XX_P$ is identical to the table change code "80" (step S409).

If the $XX_P$="80" (YES in step S409), the message converter 205 further increments the position counter 206 by two (step S410) and then checks whether the $XX_P$ is identical to the selection code "02" (step S411). When the $XX_P$="02" (YES in step S411), the message converter 205 selects the conversion table $T_2$ by setting the table counter 207 to Q=2 (step S412). When the $XX_P$ is not "02" but "03" (NO in step S411 and YES in step S413), the message converter 250 selects the conversion table $T_3$ by setting the table counter 207 to Q=3 (step S414). When the $XX_P$ is not "03" but "04" (NO in step S413 and YES in step S415), the message converter 205 selects the conversion table $T_4$ by setting the table counter 207 to Q=4 (step S416). When the $XX_P$ is not "04" (NO in step S415), the message converter 205 selects the conversion table $T_1$ by setting the table counter 207 to Q=1 (step S417).

If the $XX_P$ is not identical to "80" (NO in step S409), the message converter 205 reads a character code corresponding to the $XX_P$ from the selected conversion table $T_Q$ (step S418). Subsequently, the controller 201 reads character display data corresponding to the character code from the font memory 209 and then transfers it to the LCD controller 210 (step S419).

After the step S412, S414, S416, S417 or S419 is completed, the message converter 205 increments the position counter 206 by two (step S420) and then checks whether the position counter 206 indicates the end of the message (step S421). If the position count P does not indicate the end of the message (NO in step S421), the steps S408–S420 are repeatedly performed until the count P indicates the end of the message.

On the other hand, if the $XX_P$ is not identical to "--" (NO in step S406) or the $XX_P$ is not numeric (NO in step S408), the $XX_P$ is normal message data. Therefore, the controller 201 reads display data corresponding to the first digit of the $XX_P$ from the font memory 209 and then transfers it to the LCD controller 210 (step S422). After that, the message converter 205 increments the position counter 206 by one (step S423) and then checks whether the position counter 206 indicates the end of the message (step S424).

When the position count P indicates the end of the message (YES in steps S421 or S424), the controller 201 controls the LCD controller 210 so that the display data is displayed on LCD 105 (step S425). And the controller 201 controls the alert controller 211 so that an alert is generated by an alert device selected from the speaker 106, the LED 107 and the vibration motor 108 (step S426).

Figure 11A:
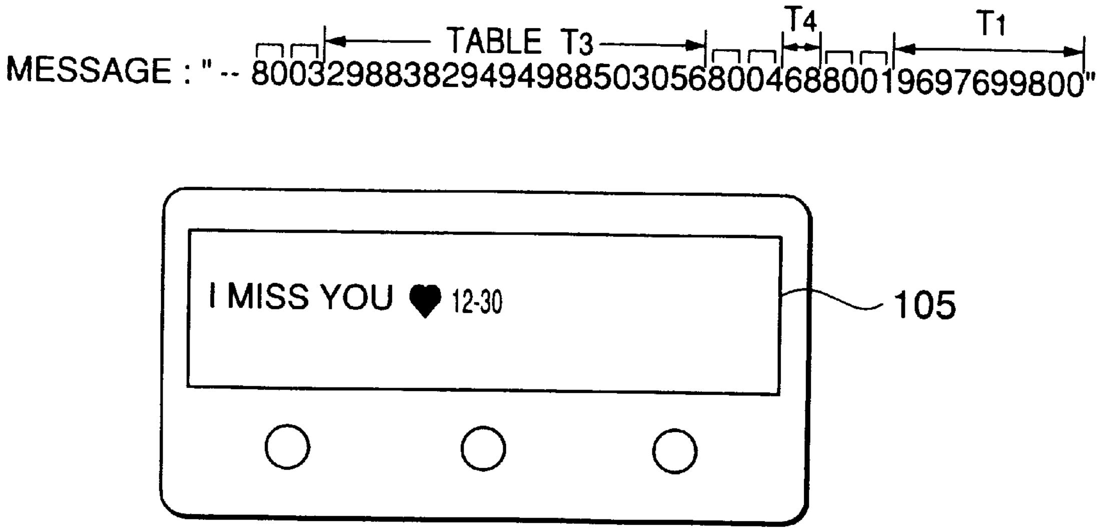
FIG. 11A is a diagram showing an example of a displayed message according to the second embodiment of a message displaying operation according to the present invention.

As illustrated in FIG. 11A, when receiving a message including a string of alphanumeric characters: "--<u>8003</u>29883829494988503056<u>8004</u>68<u>8001</u>9697699800", since the table change code "80" followed by the selection code "03" appears after the conversion code "--", the message converter 205 selects the conversion table $T_3$ which is used to convert the code "29" followed by the selection code "03" to a double-byte uppercase letter "I". Similarly, the subsequent codes "88" and "38" are converted to SPACE and an uppercase letter "M", respectively. Further, each the table change code "80" followed by a selection code is detected, a conversion table is selected from $T_1$–$T_4$ depending on the selection code. In this manner, the visual information as shown in FIG. 11A is displayed on the LCD 105.

Figure 11B:
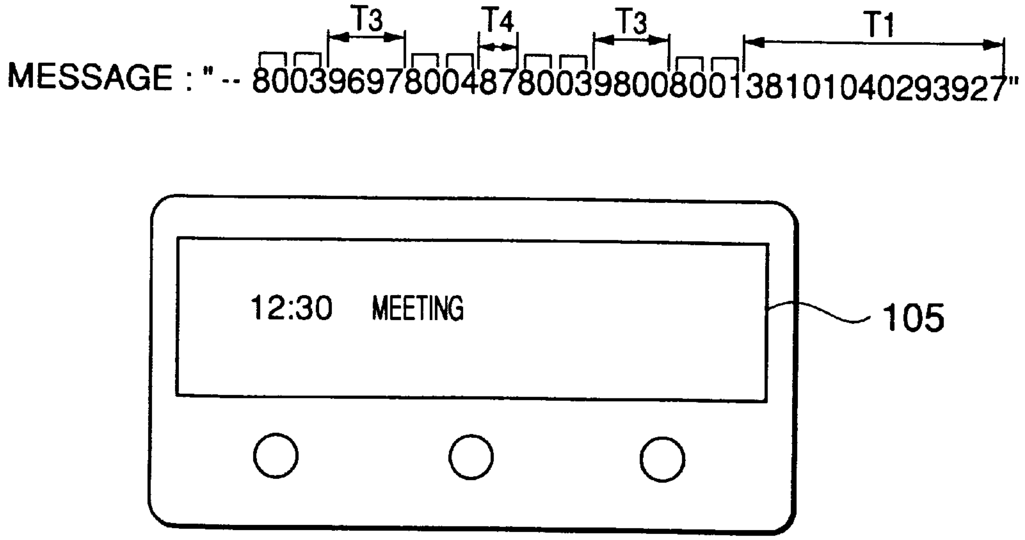
FIG. 11B is a diagram showing another example of a displaying message according to the second embodiment of a message displaying operation according to the present invention.

As illustrated in FIG. 11B, when receiving a message including a string of alphanumeric characters: "--<u>8003</u>9697<u>8004</u>87<u>8003</u>9800<u>8001</u>38101040293927", as in the case described above, the visual information as shown in FIG. 11B is displayed on the LCD 105.

As shown in FIGS. 11A and 11B, a variety of combinations of single-byte, double-byte, uppercase and lowercase letters can be achieved.

Further, the selection code and numerical codes are each formed with a combination of two numeric characters each selected from "0"–"9". Since a numeric character "0"–"9" can be formed with only four bits, a desired message can be transmitted without reducing in transmission performance.

What is claimed is:

1. A selective call receiver for receiving a selective calling signal conveying message data, comprising:

a memory for storing a plurality of conversion tables each having a different character set, wherein each conversion table is used to convert a numerical code to a display character code for displaying visual information on screen;

a table selector for selecting a conversion table from the plurality of conversion tables according to a table selection code which is included in the message data; and a converter for converting each numeral code included in the message data following in the table selection code into a display character code by using a selected conversion table.

2. The selective call receiver according to claim 1, wherein the table selection code comprises a first predetermined code indicating a beginning of conversion.

3. The selective call receiver according to claim 2, wherein the table selection code further comprises a second predetermined code at a position behind the first predetermined code, wherein the second predetermined code indicates table change from one to another in a predetermined order.

4. The selective call receiver according to claim 2, wherein the table selection code further comprises a second predetermined code at a position behind the first predetermined code, wherein the second predetermined code comprises a table change code followed by a selection code which is used to select a conversion table.

5. The selective call receiver according to claim 2, wherein the first predetermined code comprising two alphanumeric characters.

6. The selective call receiver according to claim 3, wherein the second predetermined code comprises two numeric characters.

7. The selective call receiver according to claim 4, wherein each of the table change code and the selection code comprises two numeric characters.

8. A selective call receiver for receiving a selective calling signal conveying message data, comprising:

a first memory for storing a conversion beginning code and a table selection code;

a second memory for storing a plurality of conversion tables each having a different character set, wherein each conversion table is used to convert a numeral code to a display character code for displaying visual information on a screen;

a detector for detecting the conversion beginning code and the table selection code from the message data, wherein the table selection code is a position behind the conversion beginning code; and a processor for selecting a conversion table from the plurality of conversion tables according to the table selection code and converting each numeral code included in the message data following the table selection code into a display character code by using a selected conversion table.

9. The selective call receiver according to claim 8, wherein the table selection code indicates table change from one to another in a predetermined order.

10. The selective call receiver according to claim 8, wherein the table selection code comprises a table change code followed by a selection code which is used to select a conversion table.

11. The selective call receiver according to claim 8, wherein the conversion beginning code comprises two alphanumeric characters.

12. The selective call receiver according to claim 9, wherein the table selection code comprises two numeric characters.

13. The selective call receiver according to claim 10, wherein each of the table change code and the selection code comprises two numeric characters.

14. A method for displaying a received message on screen in a selective call receiver for receiving a selective calling signal conveying message data, comprising the steps of:

storing a plurality of conversion tables each having a different character set, wherein each conversion table is used to convert a numeral code to a display character code:

selecting a conversion table from the plurality of conversion tables according to a table selection code which is included in the message data; and converting each numeral code included in message data following the table selection code into a display character code by using a selected conversion table.

15. The method according to claim 14, wherein the table selection code comprises a first predetermined code indicating a beginning of conversion.

16. The method according to claim 15, wherein the table selection code further comprises a second predetermined code at a position behind the first predetermined code, wherein the second predetermined code indicates table change from one to another in a predetermined order.

17. The method according to claim 15, wherein the table selection code further comprises a second predetermined code at a position behind the first predetermined code, wherein the second predetermined code comprises a table change code followed by a selection code which is used to select a conversion table.

18. The method according to claim 15, wherein the first predetermined code comprises two alphanumeric characters.

19. The method according to claim 16, wherein the second predetermined code comprises two numeric characters.

20. The method according to claim 17, wherein each of the table change code and the selection code comprises two numeric characters.

* * * * *